United States Patent
Jiang

(10) Patent No.: US 9,025,203 B2
(45) Date of Patent: May 5, 2015

(54) METHOD AND APPARATUS FOR GENERATING DOUBLE-SIDED PRINT PARAMETERS AND FOR DOUBLE-SIDED PRINTING

(71) Applicants: Peking University Founder Group Co., Ltd., Beijing (CN); Founder Information Industry Holdings Co., Ltd., Beijing (CN); Beijing Founder Electronics Co., Ltd., Beijing (CN)

(72) Inventor: Guoxin Jiang, Beijing (CN)

(73) Assignees: Peking University Founder Group Co., Ltd., Beijing (CN); Founder Information Industry Holdings Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/097,010

(22) Filed: Dec. 4, 2013

(65) Prior Publication Data

US 2015/0043017 A1 Feb. 12, 2015

(30) Foreign Application Priority Data

Aug. 6, 2013 (CN) .......................... 2013 1 0339713

(51) Int. Cl.
*H04N 1/60* (2006.01)
*G06K 15/02* (2006.01)
*G06K 15/16* (2006.01)
*G06F 15/00* (2006.01)

(52) U.S. Cl.
CPC .............. *G06K 15/027* (2013.01); *G06K 15/16* (2013.01)

(58) Field of Classification Search
None
See application file for complete search history.

(56) References Cited

U.S. PATENT DOCUMENTS

2006/0114497 A1* 6/2006 Anderson et al. ............ 358/1.15
2009/0268237 A1* 10/2009 Miyata ........................ 358/1.15

* cited by examiner

*Primary Examiner* — Quang N Vo
(74) *Attorney, Agent, or Firm* — Workman Nydegger

(57) ABSTRACT

A method for generating print parameters includes: obtaining a printed paper of a test sample sheet obtained by a printing device after performing double-sided printing on the test sample sheet using preset front print parameters and preset back print parameters; detecting a front effect index of a front print effect and a back effect index of a back print effect for the printed paper of the test sample sheet by a print parameter generating device; comparing the front effect index and the back effect index with a standard effect index to obtain a comparison result, or comparing the front effect index with the back effect index to obtain a comparison result; determining from the comparison result and store in the printing device front print parameters and back print parameters used for double-sided printing on a paper to be printed with the same material and attributes as the test sample sheet.

11 Claims, 8 Drawing Sheets

METHOD AND APPARATUS FOR GENERATING DOUBLE-SIDED PRINT PARAMETERS AND FOR DOUBLE-SIDED PRINTING

The present application claims priority to Chinese Patent Application No. 201310339713.6, filed with the Chinese Patent Office on Aug. 6, 2013 and entitled "method, apparatus and system for generating double-sided print parameters and for double-sided printing", which is hereby incorporated by reference in its entirety.

FIELD OF THE INVENTION

The present invention relates to the field of printing and particularly to a double-sided print parameter generating method and double-sided printing method, apparatus and system.

BACKGROUND OF THE INVENTION

In the prior art, a print device may print a paper to be printed using some print parameters for a better print effect, for example, rasterizing parameters used for rasterizing in a print process.

In a print device supporting double-sided printing, the same print parameters are typically used for the front and the back to be printed in double-sided printing on a paper to be printed. In the double-sided printing process, firstly the front of the paper to be printed is printed, and then the paper to be printed is inverted by an inverter, and the back of the paper to be printed is printed.

However high temperature may arise in the printing process, and particularly after the front of the paper to be printed is printed, the back of the paper to be printed is printed in a high-temperature environment, and since a physical medium constituting the paper to be printed may physically vary to some extent in the high-temperature environment so that with the same print parameters in use, a print effect of printing the back of the paper to be printed in the high-temperature environment may significantly differ from a print effect of printing the front of the paper to be printed in a non-high-temperature environment, thus failing to satisfy a print demand of a paper to be printed for which a high print quality is required.

SUMMARY OF THE INVENTION

Embodiments of the invention provide a method, apparatus and system for generating double-sided print parameters and for double-sided printing so as to address the problem in the prior art of unreasonable print parameters used for printing the front and the back of a paper to be printed.

In view of the foregoing problem, an embodiment of the invention provides a first method for generating double-sided print parameters, the method including:

obtaining a printed paper of a test sample sheet obtained by a printing device after performing double-sided printing on the test sample sheet using preset front print parameters and preset back print parameters;

detecting a front effect index of a front print effect and a back effect index of a back print effect respectively for the printed paper of the test sample sheet by a print parameter generating device;

comparing the front effect index and the back effect index respectively with a standard effect index to obtain a comparison result; and determining from the comparison result and storing in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

An embodiment of the invention provides a second method for generating double-sided print parameters, the method including:

obtaining a printed paper of a test sample sheet obtained by a printing device after performing double-sided printing on the test sample sheet using preset front print parameters and preset back print parameters;

detecting a front effect index of a front print effect and a back effect index of a back print effect respectively for the printed paper of the test sample sheet by a print parameter generating device;

comparing the front effect index with the back effect index to obtain a comparison result; and determining from the comparison result and storing in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

An embodiment of the invention provides a double-sided printing method based upon the foregoing methods for generating double-sided print parameters, the method including:

obtaining stored front print parameters and back print parameters used for double-sided printing on a paper to be printed with the same material and attributes as a test sample sheet; and performing double-sided printing on the paper to be printed using the front print parameters and the back print parameters of the paper to be printed to obtain a printed paper with consistent front and back print effects.

An embodiment of the invention provides a first apparatus for generating double-sided print parameters, the apparatus including:

an obtaining module configured to obtain a printed paper of a test sample sheet obtained by a printing device after performing double-sided printing on the test sample sheet using preset front print parameters and preset back print parameters;

an index determining module configured to detect a front effect index of a front print effect and a back effect index of a back print effect respectively for the printed paper of the test sample sheet;

a comparing module configured to compare the front effect index and the back effect index respectively with a standard effect index to obtain a comparison result; and a print parameter determining module configured to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

An embodiment of the invention provides a second apparatus for generating double-sided print parameters, the apparatus including:

an obtaining module configured to obtain a printed paper of a test sample sheet obtained by a printing device after performing double-sided printing on the test sample sheet using preset front print parameters and preset back print parameters;

an index determining module configured to detect a front effect index of a front print effect and a back effect index of a back print effect respectively for the printed paper of the test sample sheet;

a comparing module configured to compare the front effect index with the back effect index to obtain a comparison result; and a print parameter determining module configured to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

An embodiment of the invention provides a double-sided printing apparatus including:

an obtaining module configured to obtain stored front print parameters and back print parameters used for double-sided printing on a paper to be printed with the same material and attributes as a test sample sheet; and a printing module configured to perform double-sided printing on the paper to be printed using the front print parameters and the back print parameters of the paper to be printed to obtain a printed paper with consistent front and back print effects.

An embodiment of the invention provides a double-sided printing system including a printing device and a print parameter generating device, wherein:

the print parameter generating device is configured to obtain a printed paper of a test sample sheet obtained by a printing device after performing double-sided printing on the test sample sheet using preset front print parameters and preset back print parameters; to detect a front effect index of a front print effect and a back effect index of a back print effect respectively for the printed paper of the test sample sheet; to compare the front effect index and the back effect index respectively with a standard effect index to obtain a comparison result; and to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects; and the printing device is configured to obtain the stored front print parameters and back print parameters used for double-sided printing on the paper to be printed with the same material and attributes as the test sample sheet; and to perform double-sided printing on the paper to be printed using the front print parameters and the back print parameters of the paper to be printed to obtain the printed paper with consistent front and back print effects.

An embodiment of the invention provides a double-sided printing system including a printing device and a print parameter generating device, wherein:

the print parameter generating device is configured to obtain a printed paper of a test sample sheet obtained by a printing device after performing double-sided printing on the test sample sheet using preset front print parameters and preset back print parameters; to detect a front effect index of a front print effect and a back effect index of a back print effect respectively for the printed paper of the test sample sheet; to compare the front effect index with the back effect index to obtain a comparison result; and to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects; and the printing device is configured to obtain the stored front print parameters and back print parameters used for double-sided printing on the paper to be printed with the same material and attributes as the test sample sheet; and to perform double-sided printing on the paper to be printed using the front print parameters and the back print parameters of the paper to be printed to obtain the printed paper with consistent front and back print effects.

The embodiments of the invention have the following advantageous effects.

The method, apparatus and system for generating double-sided print parameters and for double-sided printing according to the embodiments of the invention obtain a printed paper of a test sample sheet obtained by a printing device after performing double-sided printing on the test sample sheet using preset front print parameters and preset back print parameters; detect a front effect index of a front print effect and a back effect index of a back print effect respectively for the printed paper of the test sample sheet by a print parameter generating device; compare the front effect index and the back effect index respectively with a standard effect index to obtain a comparison result; and determine from the comparison result and store in the printing device front print parameters and back print parameters used for double-sided printing on a paper to be printed with the same material and attributes as the test sample sheet, where the front print parameters and the back print parameters are used by the printing device for performing double-sided printing on the paper to be printed with the said material and the said attributes to obtain a printed paper with consistent front and back print effects. In the case that double-sided printing is performed based upon the front print parameters and the back print parameters, of the paper to be printed, generated in the foregoing method for generating double-sided print parameters, double-sided printing is performed on the front and the back of the paper to be printed respectively using their own print parameters to obtain the printed paper with consistent front and back print effects, thereby addressing the problem in the prior art of unreasonable print parameters for use in printing the front and the back of a paper to be printed.

The method, apparatus and system for generating double-sided print parameters and for double-sided printing according to the embodiments of the invention obtain a printed paper of a test sample sheet obtained by a printing device after performing double-sided printing on the test sample sheet using preset front print parameters and preset back print parameters; detect a front effect index of a front print effect and a back effect index of a back print effect respectively for the printed paper of the test sample sheet by a print parameter generating device; compare the front effect index with the back effect index to obtain a comparison result; and determine from the comparison result and store in the printing device front print parameters and back print parameters used for double-sided printing on a paper to be printed with the same material and attributes as the test sample sheet, where the front print parameters and the back print parameters are used by the printing device for performing double-sided printing on the paper to be printed with the said material and the said attributes to obtain a printed paper with consistent front and back print effects. In the case that double-sided printing is performed based upon the front print parameters and the back print parameters, of the paper to be printed, generated in the foregoing method for generating double-sided print parameters, double-sided printing is performed on the front and the back of the paper to be printed respectively using their own print parameters to obtain the printed paper with consistent front and back print effects, thereby addressing the problem in the prior art of unreasonable print parameters for use in printing the front and the back of a paper to be printed.

DETAILED DESCRIPTION OF THE EMBODIMENTS

Particular implementations of the method, apparatus and system for generating double-sided print parameters and for double-sided printing according to the embodiments of the invention will be described below with reference to the drawings.

Figure 1:
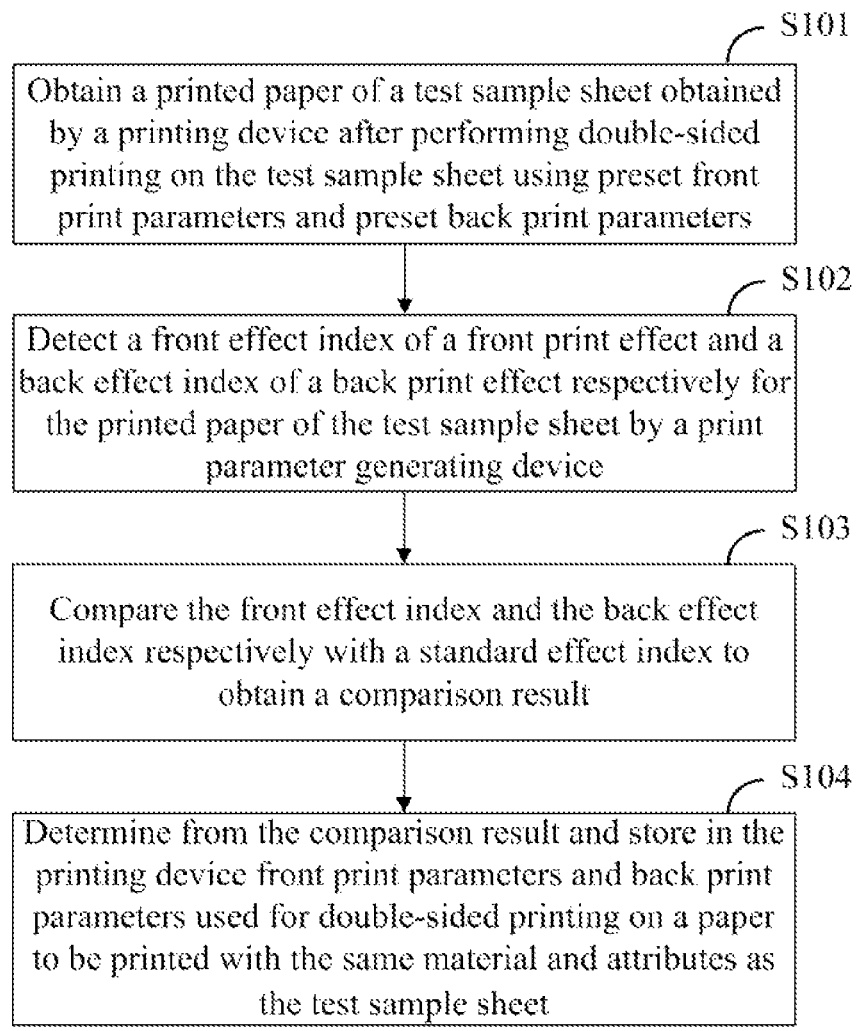
FIG. 1 is a flow chart of a first method for generating double-sided print parameters according to an embodiment of the invention.

As illustrated in FIG. 1, a first method for generating double-sided print parameters according to an embodiment of the invention particularly includes the following steps.

S101 is to obtain a printed paper of a test sample sheet obtained by a printing device after performing double-sided printing on the test sample sheet using preset front print parameters and preset back print parameters.

S102 is to detect a front effect index of a front print effect and a back effect index of a back print effect respectively for the printed paper of the test sample sheet by a print parameter generating device.

S103 is to compare the front effect index and the back effect index respectively with a standard effect index to obtain a comparison result.

S104 is to determine from the comparison result obtained in the step S103 and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

Furthermore in the step S101, the printing device performs double-sided printing on the test sample sheet using the preset front print parameters and the preset back print parameters, wherein the preset front print parameters and the preset back print parameters are the same print parameters.

Furthermore the attributes of the paper to be printed can include the size, the thickness, the density, etc., of the paper to be printed.

Figure 2:
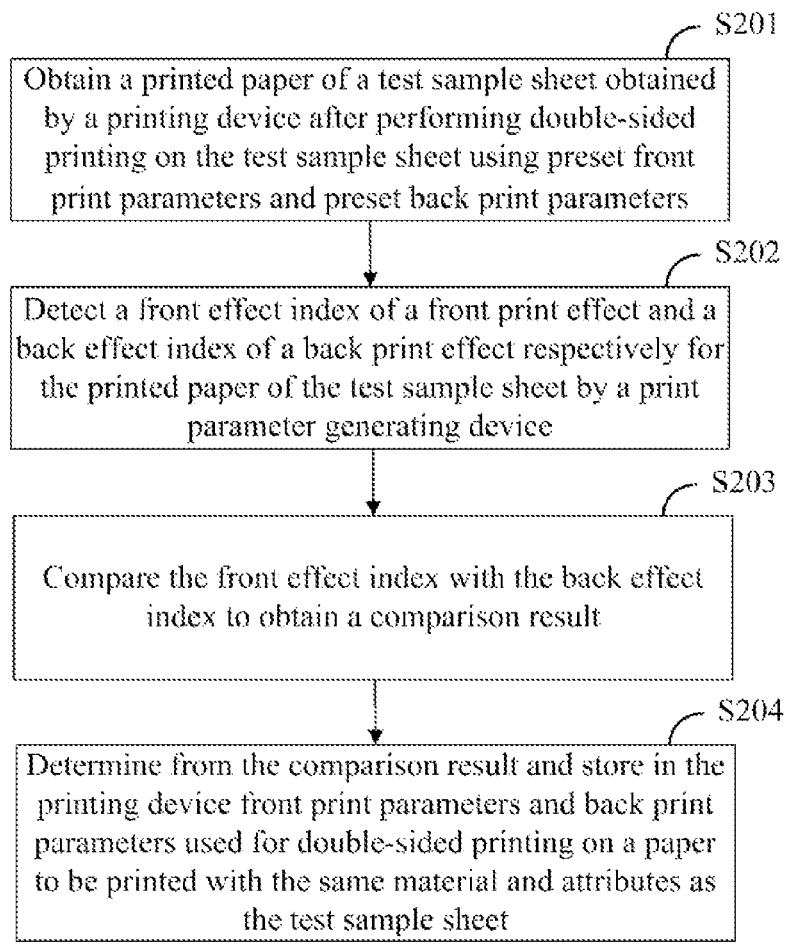
FIG. 2 is a flow chart of a second method for generating double-sided print parameters according to an embodiment of the invention.

As illustrated in FIG. 2, a second method for generating double-sided print parameters according to an embodiment of the invention particularly includes the following steps.

S201 is to obtain a printed paper of a test sample sheet obtained by a printing device after performing double-sided printing on the test sample sheet using preset front print parameters and preset back print parameters.

S202 is to detect a front effect index of a front print effect and a back effect index of a back print effect respectively for the printed paper of the test sample sheet by a print parameter generating device.

S203 is to compare the front effect index with the back effect index to obtain a comparison result.

S204 is to determine from the comparison result obtained in the step S203 and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

Furthermore in the step S201, the printing device performs double-sided printing on the test sample sheet using the preset front print parameters and the preset back print parameters, where the preset front print parameters and the preset back print parameters are the same print parameters.

Furthermore in this embodiment, the front print parameters and the back print parameters can be front rasterizing parameters and back rasterizing parameters.

Figure 3:
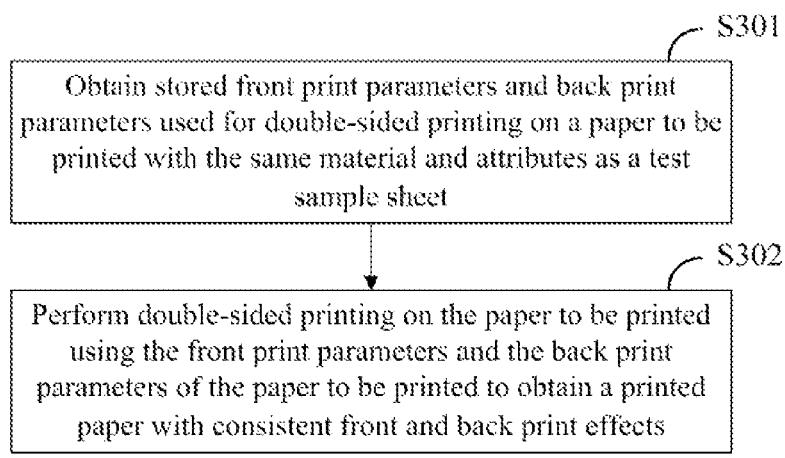
FIG. 3 is a flow chart of a double-sided printing method according to an embodiment of the invention.

Correspondingly based upon the foregoing first method for generating double-sided print parameters or the foregoing second method for generating double-sided print parameters, an embodiment of the invention further provides a double-sided printing method as illustrated in FIG. 3, the method includes the following steps.

S301 is to obtain stored front print parameters and back print parameters used for double-sided printing on a paper to be printed with the same material and attributes as a test sample sheet.

S302 is to perform double-sided printing on the paper to be printed using the front print parameters and the back print parameters of the paper to be printed to obtain a printed paper with consistent front and back print effects.

Methods and apparatuses and corresponding systems according to the invention will be described below in details by way of particular embodiments thereof with reference to the drawings.

First Embodiment

Figure 4:
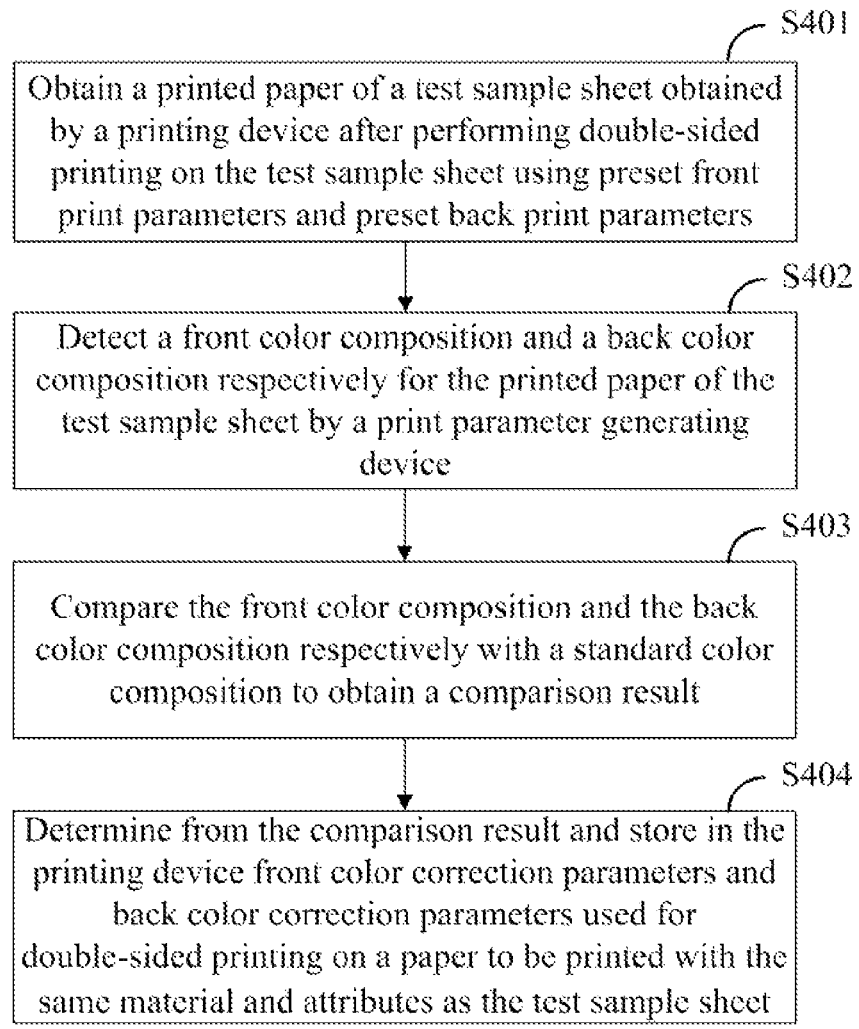
FIG. 4 is a flow chart of a method for generating double-sided print parameters according to a first embodiment of the invention.

In correspondence to the first method for generating double-sided print parameters according to the embodiment of the invention, the first embodiment of the invention provides a method for generating double-sided print parameters as illustrated in FIG. 4, the method particularly includes the following steps.

S401 is to obtain a printed paper of a test sample sheet obtained by a printing device after performing double-sided printing on the test sample sheet using preset front print parameters and preset back print parameters.

In this step, the printing device can be enabled to print a specified pattern on the test sample sheet using the preset front print parameters and the preset back print parameters to obtain the printed paper of the test sample sheet with the specified pattern printed on both the sides thereof, wherein the preset front print parameters are the same as the preset back print parameters.

S402 is to detect a front color composition and a back color composition respectively for the printed paper of the test sample sheet by a print parameter generating device.

In this step, the color compositions of the specified pattern printed on the front and the back of the test sample sheet are detected respectively by the print parameter generating device. The color composition can be percentages of elementary colors to colors of the printed specified pattern, for example, percentages of red, green and blue respectively to the colors of the printed specified pattern, or another color composition mechanism.

S403 is to compare the front color composition and the back color composition respectively with a standard color composition to obtain a comparison result.

Furthermore the standard color composition can be preset, and the color composition of the specified pattern printed on the front and the color composition of the specified pattern printed on the back are compared respectively with the preset standard color composition.

S404 is to determine from the comparison result obtained in the step S403 and store in the printing device front color correction parameters and back color correction parameters used for double-sided printing on a paper to be printed with the same material and attributes as the test sample sheet, wherein the front color correction parameters and the back color correction parameters are used by the printing device for performing double-sided printing on the paper to be printed with the said material and the said attributes to obtain a printed paper with consistent front and back color compositions.

Furthermore, the front color correction parameters and the back color correction parameters determined from the comparison result are used for double-sided printing on the paper to be printed with the same material and attributes as the test sample sheet by the printing device through adjusting the color compositions of the specified pattern printed on the front and the back of the paper to be printed respectively, to obtain the printed paper with consistent front and back color compositions and to have the obtained front and back color compositions consistent with the standard color composition.

Second Embodiment

Figure 5:
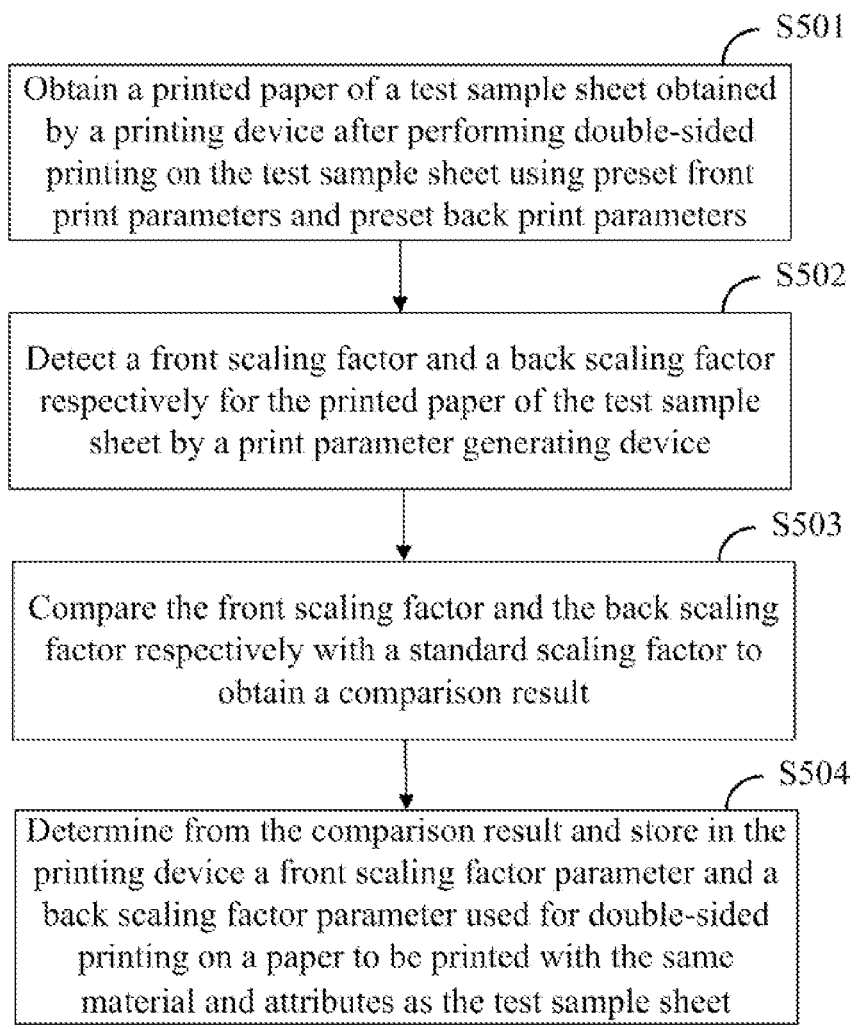
FIG. 5 is a flow chart of a method for generating double-sided print parameters according to a second embodiment of the invention.

In correspondence to the first method for generating double-sided print parameters according to the embodiment of the invention, the second embodiment of the invention provides a method for generating double-sided print parameters as illustrated in FIG. 5, the method particularly includes the following steps.

S501 is to obtain a printed paper of a test sample sheet obtained by a printing device after performing double-sided printing on the test sample sheet using preset front print parameters and preset back print parameters.

S502 is to detect a front scaling factor and a back scaling factor respectively for the printed paper of the test sample sheet by a print parameter generating device.

In this step, the scaling factors of the specified pattern printed on the front and the back of the test sample sheet are detected respectively by the print parameter generating device. The scaling factor can be a ratio of the printed specified pattern to the printed paper, or the size of the printed pattern, etc.

S503 is to compare the front scaling factor and the back scaling factor respectively with a standard scaling factor to obtain a comparison result.

Furthermore the standard scaling factor can be preset, and the scaling factor of the specified pattern printed on the front and the scaling factor of the specified pattern printed on the back are compared respectively with the preset standard scaling factor.

S504 is to determine from the comparison result obtained in the step S503 and store in the printing device a front scaling factor parameter and a back scaling factor parameter used for double-sided printing on a paper to be printed with the same material and attributes as the test sample sheet, wherein the front scaling factor parameter and the back scaling factor parameter are used by the printing device for performing double-sided printing on the paper to be printed with the said material and the said attributes to obtain a printed paper with consistent front and back scaling factors.

Furthermore, the front scaling factor parameter and the back scaling factor parameter determined from the comparison result are used for double-sided printing on the paper to be printed with the same material and attributes as the test sample sheet by the printing device through adjusting the scaling factors of the specified pattern printed on the front and the back of the paper to be printed respectively, to obtain the printed paper with consistent front and back scaling factors and to have the obtained front and back scaling factors consistent with the standard scaling factor.

Furthermore the color correction parameters can be generated for the paper to be printed (with the first embodiment), or the scaling factor parameters can be generated for the paper to be printed (with the second embodiment), or both the color correction parameters and the scaling factor parameters can be generated for the paper to be printed (with both the first embodiment and the second embodiment).

Third Embodiment

Figure 6:
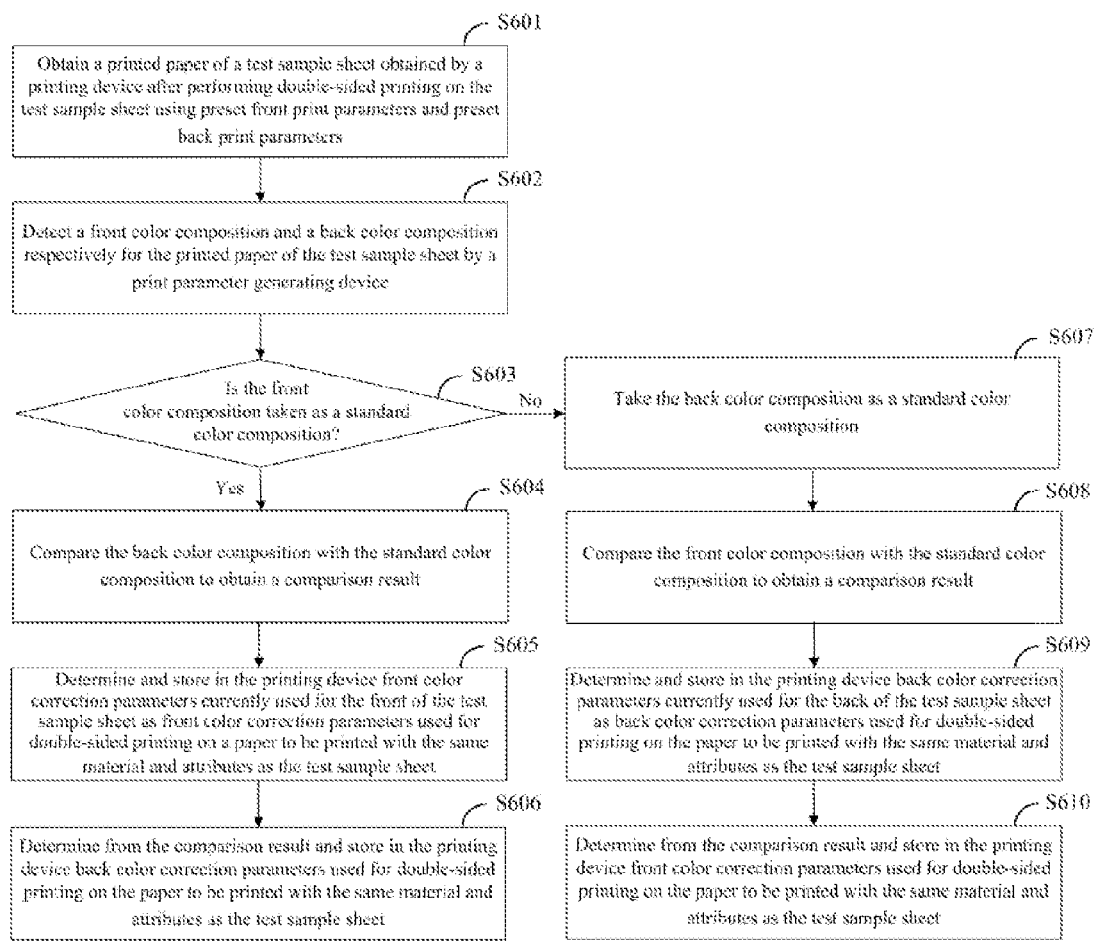
FIG. 6 is a flow chart of a method for generating double-sided print parameters according to a third embodiment of the invention.

In correspondence to the second method for generating double-sided print parameters according to the embodiment of the invention, the third embodiment of the invention provides a method for generating double-sided print parameters as illustrated in FIG. 6, the method particularly includes the following steps.

S601 is to obtain a printed paper of a test sample sheet obtained by a printing device after performing double-sided printing on the test sample sheet using preset front print parameters and preset back print parameters.

S602 is to detect a front color composition and a back color composition respectively for the printed paper of the test sample sheet by a print parameter generating device.

S603 is to take the front color composition as a standard color composition, and the flow proceeds to the step S604; otherwise, the flow proceeds to the step S607.

S604 is to compare the back color composition with the standard color composition to obtain a comparison result.

S605 is to determine and store in the printing device front color correction parameters currently used for the front of the test sample sheet as front color correction parameters used for double-sided printing on a paper to be printed with the same material and attributes as the test sample sheet, in the case that the front color composition is taken as the standard color composition.

In this step, in the case that the front color composition is taken as the standard color composition, if no front color correction parameters are currently used for the front of the test sample sheet, then no front color correction parameters are set for double-sided printing on the paper to be printed with the same material and attributes as the test sample sheet.

S606 is to determine from the comparison result obtained in the step S604 and store in the printing device back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain a printed paper with consistent front and back color compositions; and the flow ends.

S607 is to take the back color composition as a standard color composition.

S608 is to compare the front color composition with the standard color composition to obtain a comparison result.

S609 is to determine and store in the printing device back color correction parameters currently used for the back of the test sample sheet as back color correction parameters used for double-sided printing on the paper to be printed with the same material and attributes as the test sample sheet, in the case that the back color composition is taken as the standard color composition.

In this step, in the case that the back color composition is taken as the standard color composition, if no back color correction parameters are currently used for the back of the test sample sheet, then no back color correction parameters are set for double-sided printing on the paper to be printed with the same material and attributes as the test sample sheet.

S610 is to determine from the comparison result obtained in the step S608 and store in the printing device front color correction parameters used for double-sided printing on the paper to be printed with the same material and attributes as the test sample sheet; and the flow ends.

Fourth Embodiment

Figure 7:
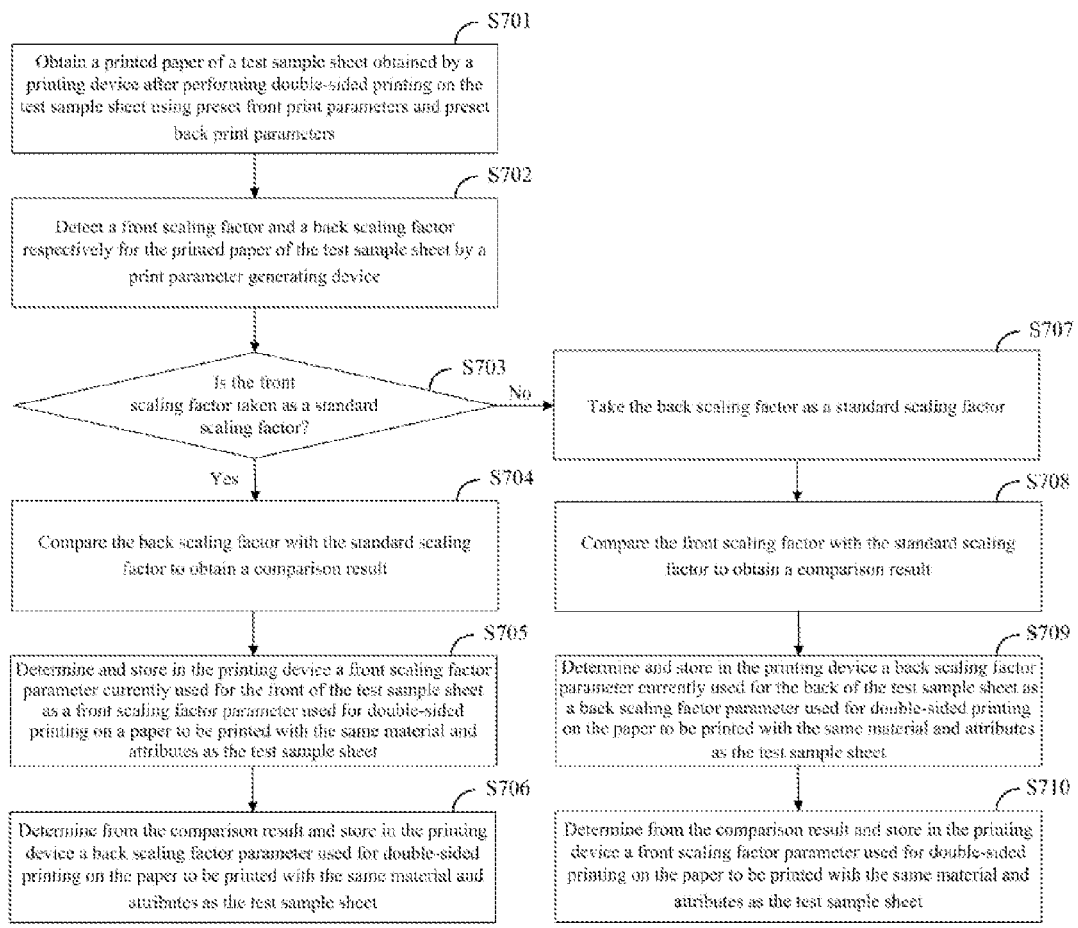
FIG. 7 is a flow chart of a method for generating double-sided print parameters according to a fourth embodiment of the invention.

In correspondence to the second method for generating double-sided print parameters according to the embodiment of the invention, the fourth embodiment of the invention provides a method for generating double-sided print parameters as illustrated in FIG. 7, the method particularly includes the following steps.

S701 is to obtain a printed paper of a test sample sheet obtained by a printing device after performing double-sided printing on the test sample sheet using preset front print parameters and preset back print parameters.

S702 is to detect a front scaling factor and a back scaling factor respectively for the printed paper of the test sample sheet by a print parameter generating device.

S703 is to take the front scaling factor as a standard scaling factor, and the flow proceeds to the step S704; otherwise, the flow proceeds to the step S707.

S704 is to compare the back scaling factor with the standard scaling factor to obtain a comparison result.

S705 is to determine and store in the printing device a front scaling factor parameter currently used for the front of the test sample sheet as a front scaling factor parameter used for double-sided printing on a paper to be printed with the same material and attributes as the test sample sheet, in the case that the front scaling factor is taken as the standard scaling factor.

In this step, in the case that the front scaling factor is taken as the standard scaling factor, if no front scaling factor parameter is currently used for the front of the test sample sheet, then no front scaling factor parameter is set for double-sided printing on the paper to be printed with the same material and attributes as the test sample sheet.

S706 is to determine from the comparison result obtained in the step S704 and store in the printing device a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain a printed paper with consistent front and back scaling factors; and the flow ends.

S707 is to take the back scaling factor as a standard scaling factor.

S708 is to compare the front scaling factor with the standard scaling factor to obtain a comparison result.

S709 is to determine and store in the printing device a back scaling factor parameter currently used for the back of the test sample sheet as a back scaling factor parameter used for double-sided printing on the paper to be printed with the same material and attributes as the test sample sheet, in the case that the back scaling factor is taken as the standard scaling factor.

In this step, in the case that the back scaling factor is taken as the standard scaling factor, if no back scaling factor parameter is currently used for the back of the test sample sheet, then no back scaling factor parameter is set for double-sided printing on the paper to be printed with the same material and attributes as the test sample sheet.

S710 is to determine from the comparison result obtained in the step S708 and store in the printing device a front scaling factor parameter used for double-sided printing on the paper to be printed with the same material and attributes as the test sample sheet; and the flow ends.

Based upon the same inventive idea, embodiments of the invention further provide a first apparatus for generating double-sided print parameters and a second apparatus for generating double-sided print parameters, and since these apparatuses address the problem under principles similar respectively to the first method for generating double-sided print parameters and the second method for generating double-sided print parameters, reference can be made to the implementations of the foregoing methods for implementations of these apparatuses, and a repeated description thereof will be omitted here.

Figure 8:
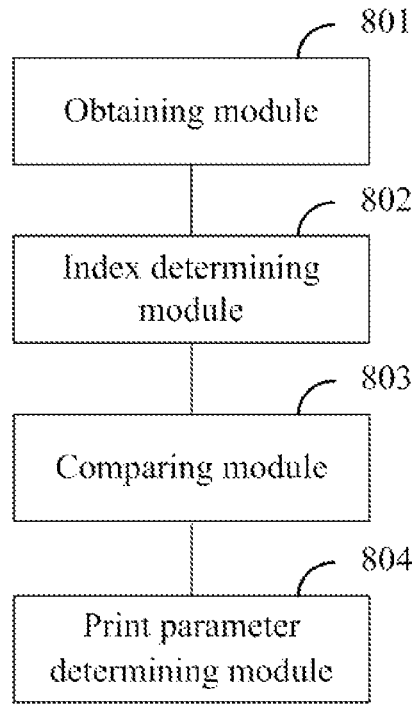
FIG. 8 is a schematic structural diagram of a first apparatus for generating double-sided print parameters according to an embodiment of the invention.

An embodiment of the invention provides the first apparatus for generating double-sided print parameters as illustrated in FIG. 8, the apparatus particularly includes the following modules.

An obtaining module 801 is configured to obtain a printed paper of a test sample sheet obtained by a printing device after performing double-sided printing on the test sample sheet using preset front print parameters and preset back print parameters.

An index determining module 802 is configured to detect a front effect index of a front print effect and a back effect index of a back print effect respectively for the printed paper of the test sample sheet by a print parameter generating device.

A comparing module 803 is configured to compare the front effect index and the back effect index respectively with a standard effect index to obtain a comparison result.

A print parameter determining module 804 is configured to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

Furthermore the index determining module 802 is further configured to detect a front color composition and a back color composition respectively for the printed paper of the test sample sheet.

The comparing module 803 is further configured to compare the front color composition and the back color composition respectively with a standard color composition to obtain the comparison result.

The print parameter determining module 804 is further configured to determine from the comparison result and store in the printing device front color correction parameters and back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions.

Furthermore the index determining module 802 is further configured to detect a front scaling factor and a back scaling factor respectively for the printed paper of the test sample sheet.

The comparing module 803 is further configured to compare the front scaling factor and the back scaling factor respectively with a standard scaling factor to obtain the comparison result.

The print parameter determining module 804 is further configured to determine from the comparison result and store in the printing device a front scaling factor parameter and a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors.

Figure 9:
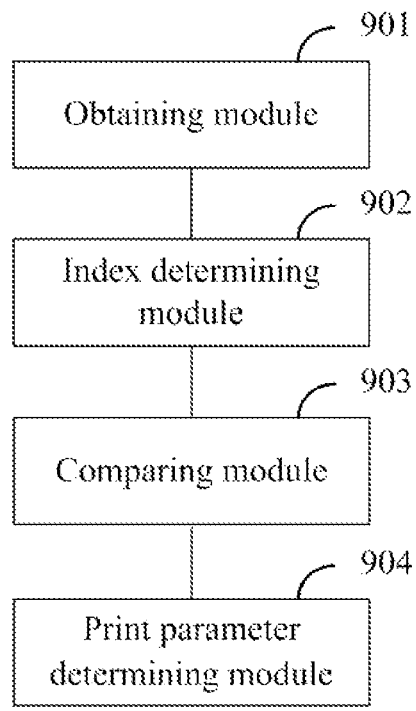
FIG. 9 is a schematic structural diagram of a second apparatus for generating double-sided print parameters according to an embodiment of the invention.

An embodiment of the invention provides the second apparatus for generating double-sided print parameters as illustrated in FIG. 9, the apparatus particularly includes the following modules.

An obtaining module 901 is configured to obtain a printed paper of a test sample sheet obtained by a printing device after performing double-sided printing on the test sample sheet using preset front print parameters and preset back print parameters.

An index determining module 902 is configured to detect a front effect index of a front print effect and a back effect index of a back print effect respectively for the printed paper of the test sample sheet.

A comparing module 903 is configured to compare the front effect index with the back effect index to obtain a comparison result.

A print parameter determining module 904 is configured to determine from the comparison result and store in the printing device front print parameters and back print parameters used for double-sided printing on a paper to be printed with the same material and attributes as the test sample sheet, where the front print parameters and the back print parameters are used by the printing device for performing double-sided printing on the paper to be printed with the said material and the said attributes to obtain a printed paper with consistent front and back print effects.

Furthermore the index determining module 902 is further configured to detect a front color composition and a back color composition respectively for the printed paper of the test sample sheet.

The comparing module 903 is further configured to take the front color composition as a standard color composition, and to compare the back color composition with the standard color composition to obtain the comparison result; or to take the back color composition as the standard color composition, and to compare the front color composition with the standard color composition to obtain the comparison result.

The print parameter determining module 904 is further configured, in the case that the front color composition is taken as the standard color composition, to determine and store in the printing device front color correction parameters currently used for the front of the test sample sheet as front color correction parameters used for double-sided printing on the paper to be printed with the same material and attributes as the test sample sheet; and to determine from the comparison result and store in the printing device back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions; or in the case that the back color composition is taken as the standard color composition, to determine and store in the printing device back color correction parameters currently used for the back of the test sample sheet as back color correction parameters used for double-sided printing on the paper to be printed with the same material and attributes as the test sample sheet; and to determine from the comparison result and store in the printing device front color correction parameters used for double-sided printing on the paper to be printed with the same material and attributes as the test sample sheet.

Furthermore the index determining module 902 is further configured to detect a front scaling factor and a back scaling factor respectively for the printed paper of the test sample sheet.

The comparing module 903 is further configured to take the front scaling factor as a standard scaling factor and to compare the back scaling factor with the standard scaling factor to obtain the comparison result; or to take the back scaling factor as the standard scaling factor and to compare the front scaling factor with the standard scaling factor to obtain the comparison result.

The print parameter determining module 904 is further configured, in the case that the front scaling factor is taken as the standard scaling factor, to determine and store in the printing device a front scaling factor parameter currently used for the front of the test sample sheet as a front scaling factor parameter used for double-sided printing on the paper to be printed with the same material and attributes as the test sample sheet; and to determine from the comparison result and store in the printing device a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors; or in the case that the back scaling factor is taken as the standard scaling factor, to determine and store in the printing device a back scaling factor parameter currently used for the back of the test sample sheet as a back scaling factor parameter used for double-sided printing on the paper to be printed with the same material and attributes as the test sample sheet; and to determine from the comparison result and store in the printing device a front scaling factor parameter used for double-sided printing on the paper to be printed with the same material and attributes as the test sample sheet.

Based upon the same inventive idea, an embodiment of the invention further provides a double-sided printing apparatus, and since the apparatus addresses the problem under a principle similar to the double-sided printing method, reference can be made to the implementation of the foregoing method for an implementation of the apparatus, and a repeated description thereof will be omitted here.

Figure 10:
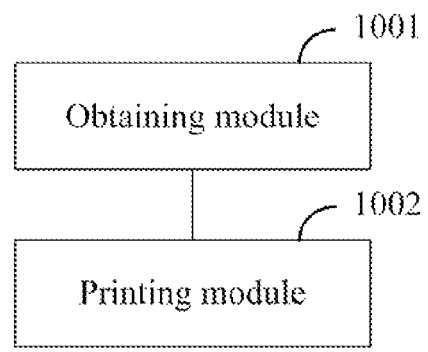
FIG. 10 is a schematic structural diagram of a double-sided printing apparatus according to an embodiment of the invention.

An embodiment of the invention provides a double-sided printing apparatus as illustrated in FIG. 10, the apparatus particularly includes the following modules.

An obtaining module 1001 is configured to obtain stored front print parameters and back print parameters used for double-sided printing on a paper to be printed with the same material and attributes as a test sample sheet.

A printing module 1002 is configured to perform double-sided printing on the paper to be printed using the front print parameters and the back print parameters of the paper to be printed to obtain a printed paper with consistent front and back print effects.

Based upon the same inventive idea, following the first method for generating double-sided print parameters and the double-sided printing method according to the embodiments of the invention, correspondingly an embodiment of the invention further provides a double-sided printing system particularly including a printing device and a print parameter generating device.

The print parameter generating device is configured to obtain a printed paper of a test sample sheet obtained by the printing device after performing double-sided printing on the test sample sheet using preset front print parameters and preset back print parameters; to detect a front effect index of a front print effect and a back effect index of a back print effect respectively for the printed paper of the test sample sheet; to compare the front effect index and the back effect index respectively with a standard effect index to obtain a comparison result; and to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

The printing device is configured to obtain the stored front print parameters and back print parameters used for double-sided printing on the paper to be printed with the same material and attributes as the test sample sheet; and to perform double-sided printing on the paper to be printed using the front print parameters and the back print parameters of the paper to be printed to obtain the printed paper with consistent front and back print effects.

Based upon the same inventive idea, following the second method for generating double-sided print parameters and the double-sided printing method according to the embodiments of the invention, correspondingly an embodiment of the invention further provides a double-sided printing system particularly including a printing device and a print parameter generating device.

The print parameter generating device is configured to obtain a printed paper of a test sample sheet obtained by the printing device after performing double-sided printing on the test sample sheet using preset front print parameters and preset back print parameters; to detect a front effect index of a front print effect and a back effect index of a back print effect respectively for the printed paper of the test sample sheet; to compare the front effect index with the back effect index to obtain a comparison result; and to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

The printing device is configured to obtain the stored front print parameters and back print parameters used for double-sided printing on the paper to be printed with the same material and attributes as the test sample sheet; and to perform double-sided printing on the paper to be printed using the front print parameters and the back print parameters of the paper to be printed to obtain the printed paper with consistent front and back print effects.

The method, apparatus and system for generating double-sided print parameters and for double-sided printing according to the embodiments of the invention obtain a printed paper of a test sample sheet obtained by a printing device after performing double-sided printing on the test sample sheet using preset front print parameters and preset back print parameters; detect a front effect index of a front print effect and a back effect index of a back print effect respectively for the printed paper of the test sample sheet by a print parameter generating device; compare the front effect index and the back effect index respectively with a standard effect index to obtain a comparison result; and determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects. In the case that double-sided printing is performed based upon the front print parameters and the back print parameters, of the paper to be printed, generated in the foregoing method for generating double-sided print parameters, double-sided printing is performed on the front and the back of the paper to be printed respectively using their own print parameters to obtain the printed paper with consistent front and back print effects, thereby addressing the problem in the prior art of unreasonable print parameters for use in printing the front and the back of a paper to be printed.

The method, apparatus and system for generating double-sided print parameters and for double-sided printing according to the embodiments of the invention obtain a printed paper of a test sample sheet obtained by a printing device after performing double-sided printing on the test sample sheet using preset front print parameters and preset back print parameters; detect a front effect index of a front print effect and a back effect index of a back print effect respectively for the printed paper of the test sample sheet by a print parameter generating device; compare the front effect index with the back effect index to obtain a comparison result; and determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects. In the case that double-sided printing is performed based upon the front print parameters and the back print parameters, of the paper to be printed, generated in the foregoing method for generating double-sided print parameters, double-sided printing is performed on the front and the back of the paper to be printed respectively using their own print parameters to obtain the printed paper with consistent front and back print effects, thereby addressing the problem in the prior art of unreasonable print parameters for use in printing the front and the back of a paper to be printed.

Those skilled in the art can clearly appreciate from the foregoing description of the embodiments that the embodiments of the invention can be implemented in hardware or software plus a necessary general hardware platform. Based upon such understanding, the technical solutions of the embodiments of the invention can be embodied in the form of a software product which can be stored in a nonvolatile storage medium (which can be a CD-ROM, a U disk, a mobile disk, etc.) and which includes several instructions to cause a computer device (which can be a personal computer, a server, a network device, etc.) to perform the methods according to the respective embodiments of the invention.

Those skilled in the art can appreciate that the drawings are merely schematic diagrams of a preferred embodiments, and the modules or the flows in the drawings may not necessarily be required to practice the invention.

Those skilled in the art can appreciate that the modules in the apparatuses of the embodiments can be distributed in the apparatuses of the embodiments as described in the embodiments or located in one or more apparatuses different from those of the embodiments given corresponding variations. The modules of the foregoing embodiments can be combined into a single module or further divided into a plurality of sub-modules.

The embodiments of the invention have been numbered only for the sake of a convenient description but will not suggest any superiority of one embodiment to another.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for generating double-sided print parameters, comprising:

obtaining a printed paper of a test sample sheet obtained by a printing device after performing double-sided printing on the test sample sheet using preset front print parameters and preset back print parameters;

detecting a front effect index of a front print effect and a back effect index of a back print effect respectively for the printed paper of the test sample sheet by a print parameter generating device;

comparing the front effect index and the back effect index respectively with a standard effect index to obtain a comparison result; or, comparing the front effect index with the back effect index to obtain a comparison result; and determining from the comparison result and storing in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

2. The method according to claim 1, wherein detecting a front effect index of a front print effect and a back effect index of a back print effect respectively for the printed paper of the test sample sheet comprises:

detecting a front color composition and a back color composition respectively for the printed paper of the test sample sheet;

and wherein comparing the front effect index and the back effect index respectively with a standard effect index to obtain a comparison result comprises:

comparing the front color composition and the back color composition respectively with a standard color composition to obtain the comparison result;

and wherein determining from the comparison result and storing in the printing device front print parameters and back print parameters used for double-sided printing on a paper to be printed with the same material and attributes as the test sample sheet comprises:

determining from the comparison result and storing in the printing device front color correction parameters and back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions.

3. The method according to claim 1, wherein detecting a front effect index of a front print effect and a back effect index of a back print effect respectively for the printed paper of the test sample sheet comprises:
   detecting a front scaling factor and a back scaling factor respectively for the printed paper of the test sample sheet;
   and wherein comparing the front effect index and the back effect index respectively with a standard effect index to obtain a comparison result comprises:
   comparing the front scaling factor and the back scaling factor respectively with a standard scaling factor to obtain the comparison result;
   and wherein determining from the comparison result and storing in the printing device front print parameters and back print parameters used for double-sided printing on a paper to be printed with the same material and attributes as the test sample sheet comprises:
   determining from the comparison result and storing in the printing device a front scaling factor parameter and a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors.

4. The method according to claim 1, wherein detecting a front effect index of a front print effect and a back effect index of a back print effect respectively for the printed paper of the test sample sheet comprises:
   detecting a front color composition and a back color composition respectively for the printed paper of the test sample sheet;
   and wherein comparing the front effect index with the back effect index to obtain a comparison result comprises:
   taking the front color composition as a standard color composition and comparing the back color composition with the standard color composition to obtain the comparison result; or
   taking the back color composition as a standard color composition and comparing the front color composition with the standard color composition to obtain the comparison result;
   and wherein determining from the comparison result and storing in the printing device front print parameters and back print parameters used for double-sided printing on a paper to be printed with the same material and attributes as the test sample sheet comprises:
   in the case that the front color composition is taken as the standard color composition, determining and storing in the printing device front color correction parameters currently used for the front of the test sample sheet as front color correction parameters used for double-sided printing on the paper to be printed with the same material and attributes as the test sample sheet; and determining from the comparison result and storing in the printing device back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions; or
   in the case that the back color composition is taken as the standard color composition, determining and storing in the printing device back color correction parameters currently used for the back of the test sample sheet as back color correction parameters used for double-sided printing on the paper to be printed with the same material and attributes as the test sample sheet; and determining from the comparison result and storing in the printing device front color correction parameters used for double-sided printing on the paper to be printed with the same material and attributes as the test sample sheet.

5. The method according to claim 1, wherein detecting a front effect index of a front print effect and a back effect index of a back print effect respectively for the printed paper of the test sample sheet comprises:
   detecting a front scaling factor and a back scaling factor respectively for the printed paper of the test sample sheet;
   and wherein comparing the front effect index with the back effect index to obtain a comparison result comprises:
   taking the front scaling factor as a standard scaling factor and comparing the back scaling factor with the standard scaling factor to obtain the comparison result; or
   taking the back scaling factor as a standard scaling factor and comparing the front scaling factor with the standard scaling factor to obtain the comparison result;
   and wherein determining from the comparison result and storing in the printing device front print parameters and back print parameters used for double-sided printing on a paper to be printed with the same material and attributes as the test sample sheet comprises:
   in the case that the front scaling factor is taken as the standard scaling factor, determining and storing in the printing device a front scaling factor parameter currently used for the front of the test sample sheet as a front scaling factor parameter used for double-sided printing on the paper to be printed with the same material and attributes as the test sample sheet; and determining from the comparison result and storing in the printing device a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors; or
   in the case that the back scaling factor is taken as the standard scaling factor, determining and storing in the printing device a back scaling factor parameter currently used for the back of the test sample sheet as a back scaling factor parameter used for double-sided printing on the paper to be printed with the same material and attributes as the test sample sheet; and determining from the comparison result and storing in the printing device a front scaling factor parameter used for double-sided printing on the paper to be printed with the same material and attributes as the test sample sheet.

6. A double-sided printing method based upon the method for generating double-sided print parameters according to claim 1, comprising:

obtaining the stored front print parameters and back print parameters used for double-sided printing on the paper to be printed with the same material and attributes as the test sample sheet; and performing double-sided printing on the paper to be printed using the front print parameters and the back print parameters of the paper to be printed to obtain the printed paper with consistent front and back print effects.

7. An apparatus for generating double-sided print parameters, comprising:

an obtaining module configured to obtain a printed paper of a test sample sheet obtained by a printing device after performing double-sided printing on the test sample sheet using preset front print parameters and preset back print parameters;

an index determining module configured to detect a front effect index of a front print effect and a back effect index of a back print effect respectively for the printed paper of the test sample sheet;

a comparing module configured to compare the front effect index and the back effect index respectively with a standard effect index to obtain a comparison result; or, configured to compare the front effect index with the back effect index to obtain a comparison result; and a print parameter determining module configured to determine from the comparison result and store in the printing device front print parameters and back print parameters used for double-sided printing on a paper to be printed with the same material and attributes as the test sample sheet, wherein the front print parameters and the back print parameters are used by the printing device for performing double-sided printing on the paper to be printed with the said material and the said attributes to obtain a printed paper with consistent front and back print effects.

8. The apparatus according to claim 7, wherein the index determining module is further configured to detect a front color composition and a back color composition respectively for the printed paper of the test sample sheet;

the comparing module is further configured to compare the front color composition and the back color composition respectively with a standard color composition to obtain the comparison result; and the print parameter determining module is further configured to determine from the comparison result and store in the printing device front color correction parameters and back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions.

9. The apparatus according to claim 7, wherein the index determining module is further configured to detect a front scaling factor and a back scaling factor respectively for the printed paper of the test sample sheet;

the comparing module is further configured to compare the front scaling factor and the back scaling factor respectively with a standard scaling factor to obtain the comparison result; and the print parameter determining module is further configured to determine from the comparison result and store in the printing device a front scaling factor parameter and a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors.

10. The apparatus according to claim 7, wherein the index determining module is further configured to detect a front color composition and a back color composition respectively for the printed paper of the test sample sheet;

the comparing module is further configured to take the front color composition as a standard color composition and to compare the back color composition with the standard color composition to obtain the comparison result; or to take the back color composition as a standard color composition and to compare the front color composition with the standard color composition to obtain the comparison result; and the print parameter determining module is further configured, in the case that the front color composition is taken as the standard color composition, to determine and store in the printing device front color correction parameters currently used for the front of the test sample sheet as front color correction parameters used for double-sided printing on the paper to be printed with the same material and attributes as the test sample sheet; and to determine from the comparison result and store in the printing device back color correction parameters used for double-sided printing on the paper to be printed with the same material and attributes as the test sample sheet, wherein the front color correction parameters and the back color correction parameters are used by the printing device for performing double-sided printing on the paper to be printed with the said material and the said attributes to obtain the printed paper with consistent front and back color compositions; or in the case that the back color composition is taken as the standard color composition, to determine and store in the printing device back color correction parameters currently used for the back of the test sample sheet as back color correction parameters used for double-sided printing on the paper to be printed with the same material and attributes as the test sample sheet; and to determine from the comparison result and store in the printing device front color correction parameters used for double-sided printing on the paper to be printed with the same material and attributes as the test sample sheet.

11. The apparatus according to claim 7, wherein the index determining module is further configured to detect a front scaling factor and a back scaling factor respectively for the printed paper of the test sample sheet;

the comparing module is further configured to take the front scaling factor as a standard scaling factor and to compare the back scaling factor with the standard scaling factor to obtain the comparison result; or to take the back scaling factor as a standard scaling factor and to compare the front scaling factor with the standard scaling factor to obtain the comparison result; and the print parameter determining module is further configured, in the case that the front scaling factor is taken as the standard scaling factor, to determine and store in the printing device a front scaling factor parameter currently used for the front of the test sample sheet as a front scaling factor parameter used for double-sided printing on the paper to be printed with the same material and attributes as the test sample sheet; and to determine from the comparison result and store in the printing device a back scaling factor parameter used for double-sided printing on the paper to be printed with the same material and attributes as the test sample sheet, wherein the front scaling factor parameter and the back scaling factor parameter are used by the printing device for performing double-sided printing on the paper to be printed with the said material and the said attributes to obtain the printed paper with consistent front and back scaling factors; or in the case that the back scaling factor is taken as the standard scaling factor, to determine and store in the printing device a back scaling factor parameter currently used for the back of the test sample sheet as a back scaling factor parameter used for double-sided printing on the paper to be printed with the same material and attributes as the test sample sheet; and to determine from the comparison result and store in the printing device a front scaling factor parameter used for double-sided printing on the paper to be printed with the same material and attributes as the test sample sheet.

\* \* \* \* \*